A. NICOL.
DEVICE FOR RAISING WATER.
No. 17,338. Patented May 19, 1857.
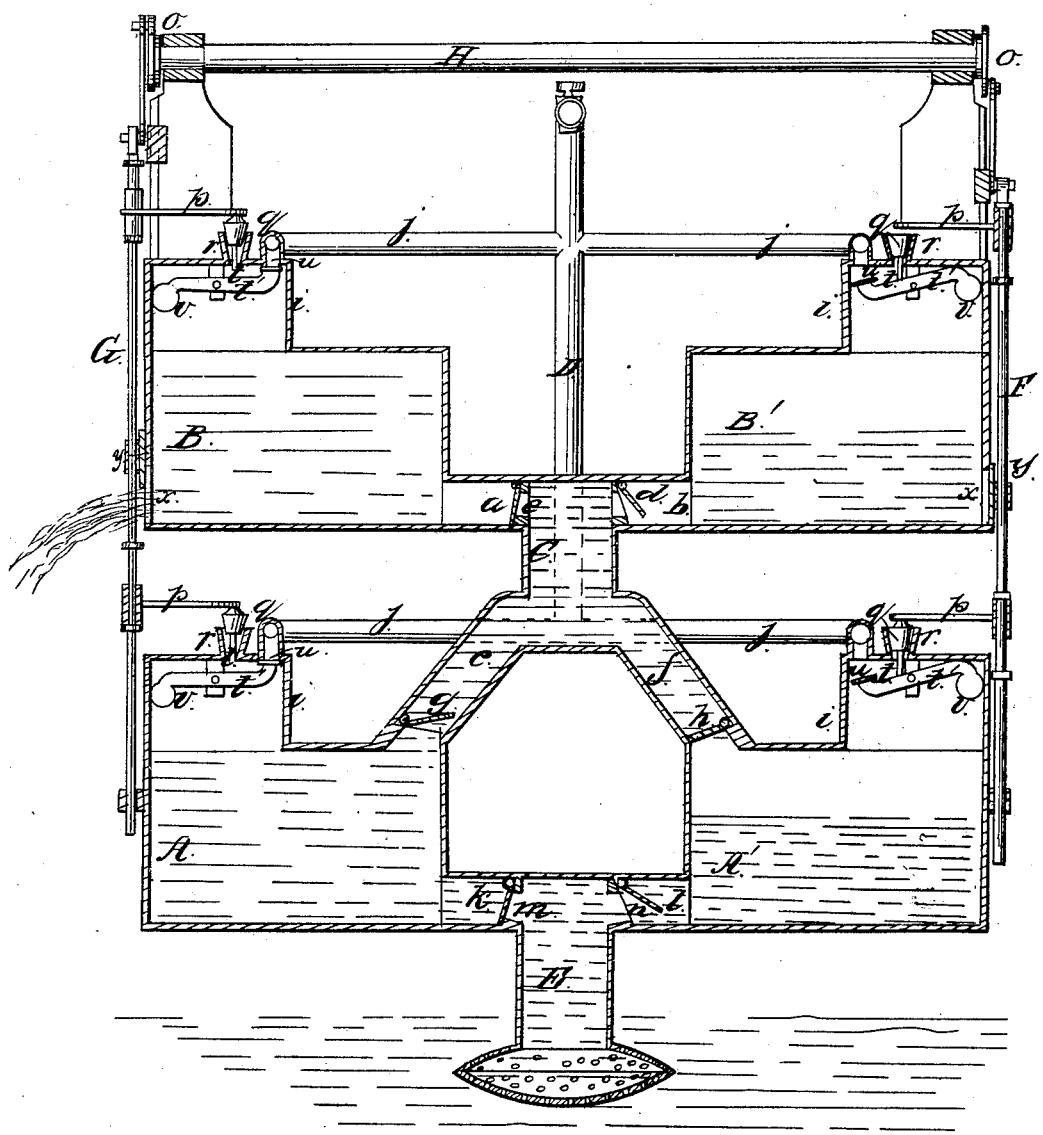

UNITED STATES PATENT OFFICE.

ANDREW NICOL, OF CARBONDALE, PENNSYLVANIA.

VALVULAR ARRANGEMENT IN APPARATUS FOR RAISING WATER.

Specification of Letters Patent No. 17,338, dated May 19, 1857.

*To all whom it may concern:*

Be it known that I, ANDREW NICOL, of Carbondale, in the county of Luzerne and State of Pennsylvania, have invented a new and useful Device for Raising Water; and I do hereby declare that the following is a full, clear, and exact description of the same, reference being had to the annexed drawing, making a part of this specification, said drawing being a vertical section of my improvement.

This invention relates to an improved device for raising water, whereby water may be raised by atmospheric pressure above 33 feet or the point at which its weight is balanced by the pressure of the atmosphere.

To enable those skilled in the art to fully understand and construct my invention I will proceed to describe its construction and operation.

A, A′, B, B′, represent four chambers or vessels, the chambers B, B′, being placed above the chambers A, A′.

C, represents a vertical tube, to the upper part of which the horizontal tubes (a) (b) are attached, the tube (a) communicating with the chamber B, and the tube (b) communicating with the chamber B′. The inner ends of the tubes (a) (b) at their junction with the tube C are provided with valves (c) (d) which open outward from the tube C. To the lower end of the tube C two tubes (e) (f) are attached; the tube (e) communicating with the chamber A, and the tube (f) communicating with the chamber A′. In the lower end of the tube (e) a valve (g) is placed, and a valve (h) is placed in the lower end of the tube (f) said valves opening upward.

On the upper part of each chamber or vessel a chest (i) is placed, the chest communicating with the vessels, and (j) are tubes which communicate with the chests (i), the tubes (j) being connected to the suction pipe, D, the suction being produced in said pipe by a pump or by any proper means.

E is a pipe which has two tube (k) (l) attached to its upper end. One of these tubes (k) communicates with the lower part of the chamber or vessel A, and the other tube (l) communicates with the lower part of the chamber or vessel A′. The ends of the tubes (k) (l) at their junction with the pipe E are provided with valves (m) (n) said valves opening outward from the pipe E.

F, G, represent rods which are attached to the ends of the chambers A, A′, B, B′, one rod to each two or pair of chambers. Those rods are allowed to slide or work up and down and their upper ends are connected by cranks (o) (o) on a shaft H, the cranks being placed in reverse positions on said shaft. To each rod F, G, two arms (p) (p) are attached, these arms have valves (q) at their ends, a valve being attached to each arm. The valves work in conical seats (r) on the chests (i) and each valve has a stem (t) attached which, when the valves are closed, actuate levers (t′) and open valves (u) which cover the orifices of the tubes (j).

The operation is as follows: A vacuum or suction is produced in the pipe D by any proper means, and a rotary motion is given the shaft H. The two rods F, G, have an opposite reciprocating motion given them by the reverse cranks (o), (o) so that when the valves (q) of the two chambers A, B, are open, the two opposite ones are closed and vice versa. When the valves of the chambers A′, B′, are closed, as shown in the drawing, a vacuum is produced in the chamber A′, and the water passes up the pipe E and enters through valve (l) and fills chamber A′ while this chamber is being filled the valve (q) of the chamber A is open, and the water in said chamber which was drawn into it previously to the filling of chamber A′, is forced up by the pressure of the atmosphere through the valve (g) into the tube (e), and through the valve (d) into the chamber B′, the valve (q) of chamber B′ closing as the valve (q) of chamber A opens. While the water is being forced from chamber A into chamber B′, a vacuum is produced in chamber A′, and said chamber is being filled with water while the water in A is being forced from it. When the valves (q) are open, the orifices of the pipes (j) are closed by the valves (u), the levers (t) having weights (v) at their ends, said weights keeping the valves closed when the stems (t) are raised from the levers. As the valves (q) of the upper chambers B, B′, open, the water is forced out through openings (x), which are closed when the water is forced into said chambers by gates (y) attached to the rods F, G.

The object in having two pairs of chambers A, B′, and A′, B, is that a continuous stream or a constant supply of water is carried or forced upward. If the chambers A′, B, were only used an intermittent stream would be forced from the chamber B. The lower chambers should be 28 or 30 feet above the reservoir of water, and the upper chamber should be the same distance above the lower ones.

By this device it will be seen that water may be elevated any height solely by atmospheric pressure and the invention will prove highly valuable for elevating water from mines, and in all cases where water is elevated from great depths. At present the pumping of water from mines is attended with a vast deal of expense, the devices employed being not only expensive as regards their first cost added to that of the expense of repairs, but the cost of the power necessary to keep the devices in operation is also great.

My improvement is very simple, may be constructed at a comparatively small cost, and the suction may be produced in the pipe D by merely having steam pass through a pipe connected at its upper end, the steam pipe leading direct from a steam boiler. In the latter case no pump would be required for producing a suction in the pipe D.

Having thus described my invention, what I claim as new, and desire to secure by Letters Patent, is—

The rods F, G, provided with the valves, $(q)$ $(q)$ and operated as shown in combination with the chambers or vessels A, A′, B, B′, suction pipe D, and branch pipes $(j)$ and the tubes C, $(a)$ $(b)$ $(e)$ $(f)$ provided with the valves $(e)$ $(d)$ $(g)$ $(h)$; the whole being arranged as described for the purpose specified.

ANDREW NICOL.

Witnesses:
JOHN LYNN,
WILLIAM ROOT.